US009830740B2

(12) United States Patent
Cho et al.

(10) Patent No.: US 9,830,740 B2
(45) Date of Patent: Nov. 28, 2017

(54) GRAPHIC PROCESSING UNIT, SYSTEM AND ANTI-ALIASING METHOD TO PERFORM RENDERING BASED ON IMAGE INFORMATION

(71) Applicant: SAMSUNG ELECTRONICS CO., LTD., Suwon-si, Gyeonggi-do (KR)

(72) Inventors: Yong-Kwon Cho, Yongin-si (KR); Chang-Hyo Yu, Yongin-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 135 days.

(21) Appl. No.: 14/835,060

(22) Filed: Aug. 25, 2015

(65) Prior Publication Data
US 2016/0110914 A1     Apr. 21, 2016

(30) Foreign Application Priority Data
Oct. 21, 2014  (KR) .................. 10-2014-0142675

(51) Int. Cl.
*G06T 15/50* (2011.01)
*G06T 15/80* (2011.01)
*G06T 15/10* (2011.01)
*G06T 11/40* (2006.01)
*G06T 15/00* (2011.01)

(52) U.S. Cl.
CPC ............ *G06T 15/503* (2013.01); *G06T 11/40* (2013.01); *G06T 15/005* (2013.01); *G06T 15/10* (2013.01); *G06T 15/80* (2013.01)

(58) Field of Classification Search
None
See application file for complete search history.

(56) References Cited

U.S. PATENT DOCUMENTS

| 5,990,904 A | 11/1999 | Griffin |
| 6,967,663 B1 | 11/2005 | Bastos et al. |
| 7,245,302 B1 * | 7/2007 | Donham .................. G06T 1/20 345/426 |

(Continued)

FOREIGN PATENT DOCUMENTS

| JP | 2007-018124 | 1/2007 |
| JP | 2010-102713 | 5/2010 |

(Continued)

OTHER PUBLICATIONS

Search Report for the corresponding UK Patent Application No. 1518260.3 dated Feb. 22, 2016.

*Primary Examiner* — Vu Nguyen
(74) *Attorney, Agent, or Firm* — F. Chau & Associates, LLC

(57) ABSTRACT

A graphic processing unit includes a geometry processing unit and a rendering processing unit. The geometry processing unit is configured to receive vertexes and to generate at least one primitive using the vertexes. The rendering processing unit is configured to convert the generated at least one primitive into fragments, to perform fragment shading on the converted fragments, and to perform anti-aliasing on the fragments on which the fragment shading has been performed. The rendering processing unit performs the anti-aliasing on first color data and second color data that is different from the first color data using different operations from each other.

18 Claims, 15 Drawing Sheets

(56) References Cited

U.S. PATENT DOCUMENTS

| | | |
|---|---|---|
| 7,348,996 B2 | 3/2008 | Akenine-Moller et al. |
| 8,130,227 B2 | 3/2012 | Johnson et al. |
| 8,345,063 B2 | 1/2013 | Iourcha et al. |
| 2005/0017969 A1* | 1/2005 | Sen ............... G06T 15/04 345/419 |
| 2005/0117036 A1 | 6/2005 | Nishi et al. |
| 2006/0181620 A1 | 8/2006 | Kimbell |
| 2010/0110102 A1 | 5/2010 | Nystad et al. |
| 2011/0063480 A1 | 3/2011 | Kim |
| 2011/0154307 A1* | 6/2011 | Upton ............... G06T 11/40 717/146 |
| 2012/0013624 A1 | 1/2012 | Fowler |
| 2012/0081385 A1 | 4/2012 | Cote et al. |
| 2012/0154429 A1 | 6/2012 | Cho et al. |
| 2013/0141445 A1* | 6/2013 | Engh-halstvedt ....... G06T 5/002 345/506 |
| 2015/0138228 A1* | 5/2015 | Lum ............... G06T 15/503 345/611 |

FOREIGN PATENT DOCUMENTS

| | | |
|---|---|---|
| JP | 2013-137756 | 7/2013 |
| KR | 1020110093457 | 8/2011 |
| KR | 1020120069134 | 6/2012 |

\* cited by examiner

FIG. 7

Primitive List

|  | Position | Attribute | Texture Patch |
|---|---|---|---|
| Tile n | Ptr_Pa_P | Ptr_Pa_A | Ptr_TPa_Dsc |
|  | Ptr_Pb_P | Ptr_Pb_A | Ptr_TPb_Dsc |
|  | Ptr_Pc_P | Ptr_Pc_A | Ptr_TPc_Dsc |
| Tile (n+1) | ⋮ | ⋮ | ⋮ |
| ⋮ | ⋮ | ⋮ | ⋮ |

GRAPHIC PROCESSING UNIT, SYSTEM AND ANTI-ALIASING METHOD TO PERFORM RENDERING BASED ON IMAGE INFORMATION

CROSS-REFERENCE TO RELATED APPLICATIONS

This application claims priority under 35 U.S.C. §119 to Korean Patent Application No. 10-2014-0142675, filed on Oct. 21, 2014, in the Korean Intellectual Property Office, the disclosure of which is incorporated by reference herein in its entirety.

TECHNICAL FIELD

The present inventive concept relates to a graphic processing unit, a graphic processing system including the graphic processing unit, and an anti-aliasing method using the graphic processing unit.

DISCUSSION OF THE RELATED ART

A graphic processing unit (GPU) is a core that performs graphic processing operations in a computing system. A graphics pipeline, a hardware configuration of the GPU, may receive a three-dimensional (3D) object as an input and a two-dimensional (2D) rendering image as an output. As graphic resolution increases, demand for higher performing GPU and larger memory bandwidth also increases.

SUMMARY

According to an exemplary embodiment of the present inventive concept, a graphic processing unit is provided. The graphic processing unit includes a geometry processing unit and a rendering processing unit. The geometry processing unit is configured to receive vertexes and to generate at least one primitive using the vertexes. The rendering processing unit is configured to convert the generated at least one primitive into fragments, to perform fragment shading on the converted fragments, and to perform anti-aliasing on the fragments on which the fragment shading has been performed. The rendering processing unit performs the anti-aliasing on first color data and second color data that is different from the first color data using different operations from each other.

The rendering processing unit may perform the anti-aliasing on the first color data and the second color data using different numbers of sampling data from each other.

The rendering processing unit may use a supersampling anti-aliasing (SSAA) method, a multisampling anti-aliasing (MSAA) method, or a morphological anti-aliasing (MLAA) method.

The rendering processing unit may perform the anti-aliasing on the first color data and the rendering processing unit may not perform the anti-aliasing on the second color data.

The rendering processing unit may perform the fragment shading on the first color data and the second color data using different operations from each other.

The geometry processing unit may include a vertex processing unit and a primitive assembly unit. The vertex processing unit may be configured to receive the vertexes, to convert the received vertexes, and to output the converted vertexes. The primitive assembly unit may be configured to generate the at least one primitive and texture patch information corresponding to the at least one primitive using the converted vertexes.

The at least one primitive may be of a triangle type.

The geometry processing unit may further include a tiling unit. The tiling unit may be configured to divide an image frame into a plurality of tiles and to generate a first primitive list of the at least one primitive corresponding to a first tile of the plurality of tiles.

The first primitive list may include position information and attribute information of the at least one primitive corresponding to the first tile.

The rendering processing unit may include a rasterizer and a fragment processing unit. The rasterizer may be configured to perform rasterization on the at least one primitive to convert the at least one primitive into the fragments. The fragment processing unit may be configured to perform the anti-aliasing on the fragments.

The rendering processing unit may further include a depth tester. The depth tester may be configured to perform visibility test on the at least one primitive, to determine an invisible primitive among the at least one primitive, and to discard the invisible primitive. The rasterizer may perform rasterization on an output of the depth tester.

According to an exemplary embodiment of the present inventive concept, a graphic processing unit is provided. The graphic processing unit includes a primitive assembly unit, a tiling unit, and a rendering unit. The primitive assembly unit is configured to receive vertexes and to generate at least one primitive using the vertexes. The tiling unit is configured to divide an image frame into a plurality of tiles and to generate texture patch information corresponding to the at least one primitive. The at least one primitive corresponds to a first tile of the plurality of tiles. The rendering processing unit is configured to perform fragment shading on fragments in the at least one primitive using the generated texture patch information. The rendering processing unit performs the fragment shading on first color data and second color data that is different from the first color data using different operations from each other.

The rendering processing unit may perform the fragment shading on the first color data and the second color data using different numbers of sampling data from each other.

The rendering processing unit may perform the fragment shading on the first color data, and the rendering processing unit may not perform the fragment shading on the second color data.

According to an exemplary embodiment of the present inventive concept, a graphic processing system is provided. The graphic processing system includes a graphic processing unit and an external memory. The graphic processing unit is configured to perform anti-aliasing on first color data and second color data that is different from the first color data. The external memory is configured to store first data generated when the graphic processing unit performs the anti-aliasing. The graphic processing unit performs the anti-aliasing on the first color data and the second color data using different operations from each other.

The graphic processing unit may perform the anti-aliasing on the first color data and the second color data using different numbers of sampling data from each other.

The graphic processing unit may perform the anti-aliasing using a supersampling anti-aliasing (SSAA) method, a multisampling anti-aliasing method (MSAA), or a morphological anti-aliasing (MLAA) method.

The graphic processing unit may perform the anti-aliasing on the first color data, and the graphic processing unit may not perform the anti-aliasing on the second color data.

The graphic processing unit may generate at least one primitive using vertexes, convert the at least one primitive into fragments, and perform fragment shading on the converted fragments.

The graphic processing unit may perform the fragment shading on the first color data and the second color data using different operations from each other.

The graphic processing unit may perform the fragment shading on the first color data, and the graphic processing unit may not perform the fragment shading on the second color data.

The graphic processing system may further include a display unit. The display unit may be configured to display the first data stored in the external memory.

According to an exemplary embodiment of the present inventive concept, an anti-aliasing method is provided. The method includes receiving vertexes, generating at least one primitive using the vertexes, defining texture patches that correspond to the at least one primitive, converting the at least one primitive into fragments by performing rasterization on the generated at least one primitive, performing fragment shading on the fragments using the defined texture patches, and performing anti-aliasing on the fragments of which the fragment shading has been performed. When performing the anti-aliasing, different operations from each other are performed on first color data and second color data that is different from the first color data.

The performing the anti-aliasing may use different numbers of sampling data from each other on the first color data and the second color data.

The performing the anti-aliasing may use a supersampling Anti-aliasing (SSAA) method, a multisampling anti-aliasing (MSAA) method, or a morphological anti-aliasing (MLAA) method.

The anti-aliasing may be performed on the first color data, and the anti-aliasing may not be performed on the second color data.

According to an exemplary embodiment of the present inventive concept, a graphic processing unit is provided. The graphic processing unit includes a geometry processing unit and a rendering processing unit. The geometry processing unit is configured to receive vertexes and to generate a first primitive and a second primitive using the vertexes. The rendering processing unit is configured to convert the first primitive into fragments, to perform fragment shading on the fragments, and to perform anti-aliasing on the fragments on which the fragment shading has been performed. The rending processing unit includes a depth tester. The depth tester is configured to determine the first primitive as a visible primitive, to determine the second primitive as an invisible primitive, and to discard the second primitive. The rendering processing unit may perform the fragment shading on first color data and second color data using different operations from each other. A degree of importance of the first color data is higher than a degree of importance of the second color data.

The first color data may include a chroma component, and the second color data may include a luma component.

The rendering processing unit may perform the fragment shading on the first color data using a first number of sampling data, and perform the fragment shading on the second color data using a second number of sampling data. The second number of sampling data may be smaller than the first number of sampling data.

The rendering processing unit may perform the fragment shading on the first color data, and the rendering processing unit may not perform the fragment shading on the second color data.

The rendering processing unit may perform the anti-aliasing on the first color data and the second color data using different operations from each other.

The rendering processing unit may perform the anti-aliasing on the first color data and the second color data using different numbers of sampling data from each other.

BRIEF DESCRIPTION OF THE DRAWINGS

The above and other features of the present inventive concept will be more apparent from the following detailed description of exemplary embodiments thereof, taken in conjunction with the accompanying drawings, in which:

FIG. 7 is a diagram illustrating an exemplary primitive list generated by a primitive list generator of FIG. 5 according to an embodiment of the present inventive concept;

DETAILED DESCRIPTION OF THE EMBODIMENTS

The present invention will now be described more fully hereinafter with reference to the accompanying drawings, in which exemplary embodiments of the present inventive concept are shown. This present inventive concept may, however, be embodied in different forms without departing from the spirit and scope of the present inventive concept and should not be construed as limited to the embodiments set forth herein. The same reference numbers may designate the same elements throughout the specification and drawings. In the attached figures, the thickness of layers and regions may be exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context.

Hereinafter, referring to FIGS. 1 to 5, a computing system including a graphic processing unit to which a method for controlling rendering quality according to an embodiment of the present inventive concept is applied will be described.

Figure 1:
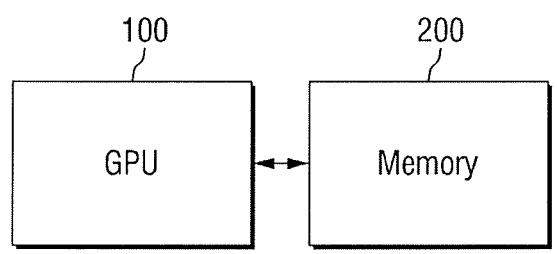
FIG. 1 is a block diagram illustrating a graphic processing system according to an embodiment of the present inventive concept.

FIG. 1 is a block diagram illustrating a graphic processing system according to an embodiment of the present inventive concept.

Referring to FIG. 1, a graphic processing system according to an embodiment of the present inventive concept includes a graphic processing unit (GPU) 100 and an external memory 200.

The graphic processing unit 100 may receive vertexes, generate primitives using the received vertexes, convert the generated primitives into fragments, and perform fragment shading on the converted fragments.

The graphic processing unit 100 may perform rendering. For example, the graphic processing unit 100 may perform tile-based rendering. To this end, the graphic processing unit 100 may include graphics pipelines.

The graphics pipeline may be referred to as a rendering pipeline. The graphics pipelines may process input graphic data in parallel (e.g., in a pipelined manner). The graphics pipelines may be formed by a software or hardware approach.

When performing the rendering, the graphic processing unit 100 may perform anti-aliasing. For example, in the case of performing the anti-aliasing, the graphic processing unit 100 may perform different operations on first color data CD_1 and second color data CD_2.

For example, when a color format of color data that is input through a color channel is YCbCr, the graphic processing unit 100 may perform different operations on a luma component and a chroma component. If the first color data CD_1 includes information on the luma component and the second color data CD_2 includes information on the chroma component, the graphic processing unit 100 may perform the anti-aliasing on the first color data CD_1 and the second color data CD_2 using different operations from each other.

Since a human eye reacts on the luma component more sensitively than the chroma component, a degree of importance of the first color data CD_1 may be higher than that of the second color data CD_2. Accordingly, the graphic processing unit 100 may perform the anti-aliasing on the first color data CD_1 and the second color data CD_2 using different operations from each other. For example, the graphic processing unit 100 may perform the anti-aliasing on the first color data CD_1 and the second color data CD_2 using different numbers of sampling data from each other.

In the case of performing the anti-aliasing using a multisampling anti-aliasing (MSAA) method, the graphic processing unit 100 may perform the anti-aliasing by applying 8 times MSAA (8×MSAA) to the first color data CD_1, and may perform the anti-aliasing by applying four times MSAA (4×MSAA), two times MSAA (2×MSAA), or a single sample to the second color data CD_2.

In this case, the entire amount of operations of the graphic processing unit 100 may be reduced, and thus, an operating speed of the graphic processing unit 100 may be increased.

When performing the anti-aliasing using a supersampling anti-aliasing (SSAA) method, a morphological anti-aliasing (MLAA) method, or the like, the graphic processing unit 100 may perform the anti-aliasing on the first color data CD_1 and the second color data CD_2 using different numbers of sampling data from each other.

For example, when performing the anti-aliasing on different color data from each other having color formats (e.g., YC, YCbCr, and YPbPr) of which degrees of importance are different from each other, the graphic processing unit 100 may perform the anti-aliasing on the different color data from each other using the different numbers of sampling data from each other.

Further, the graphic processing unit 100 may perform the anti-aliasing on the first color data CD_1 and may not perform the anti-aliasing on the second color data CD_2. For example, in the case of performing the anti-aliasing on the color formats (e.g., YC, YCbCr, and YPbPr) of the color data having different degrees of importance from each other, the graphic processing unit 100 may perform the anti-aliasing on the first color data CD_1 and may not perform the anti-aliasing on the second color data CD_2. Here, the first color data CD_1 may include information on the luma component, and the second color data CD_2 may include information on the chroma component.

The external memory 200 may be used for the graphic processing unit 100 to perform rendering. Further, the external memory 200 may be used for the graphic processing unit 100 to perform the anti-aliasing. As described above, the external memory 200 may be configured to store data. For example, the external memory 200 may be used to store graphic data that is processed by the graphic processing unit 100 or to store graphic data that is provided to the graphic processing unit 100. In the external memory 200, graphic data on which the anti-aliasing has been performed by the graphic processing unit 100 may be stored.

In addition, the external memory 200 may serve as an operating memory of the graphic processing unit 100. The external memory 200 may include at least one volatile memory such as a double data rate static dynamic random access memory (DDR SDRAM), a single data rate synchronous dynamic random access memory (SDR SDRAM), or the like, and/or at least one nonvolatile memory such as an electrical erasable programmable read only memory (EEPROM), a flash memory, or the like.

Figure 2:
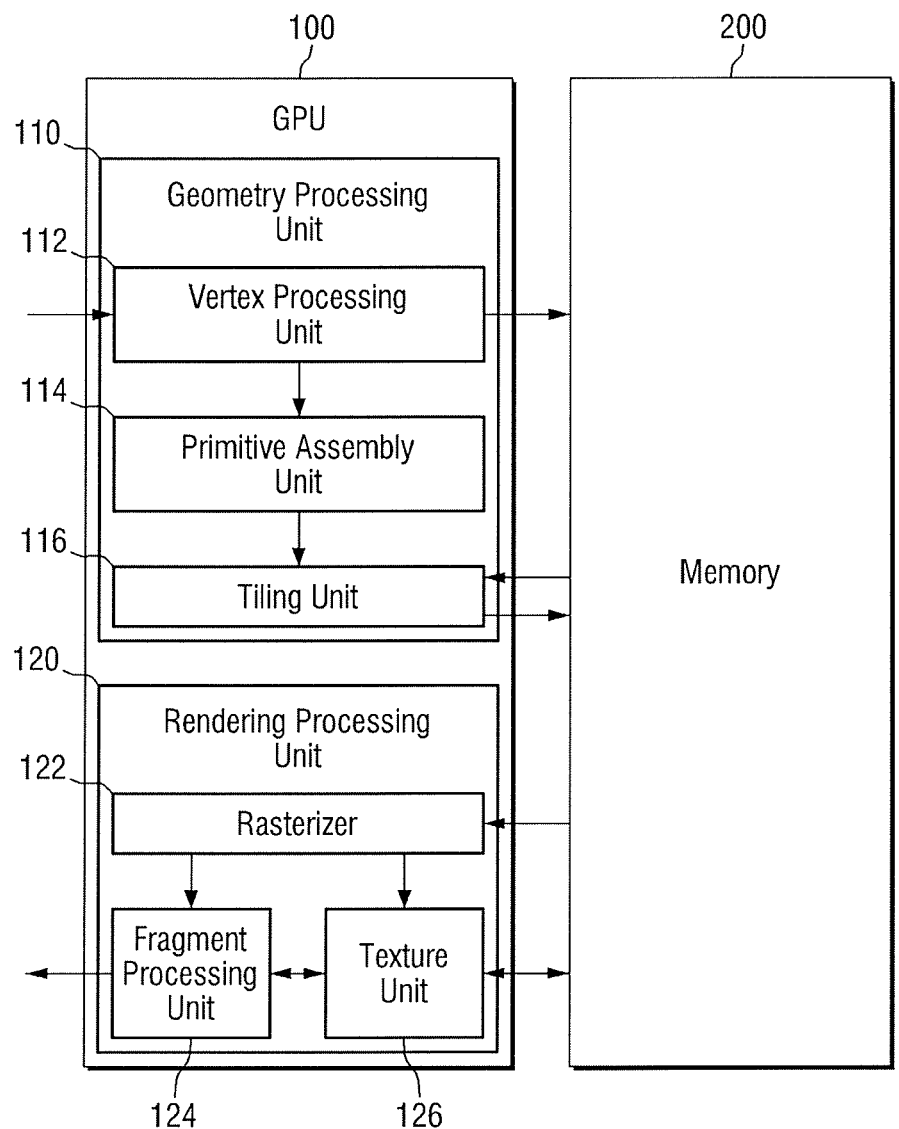
FIG. 2 is a block diagram illustrating a detailed configuration of a graphic processing unit according to an embodiment of the present inventive concept.

FIG. 2 is a block diagram illustrating a detailed configuration of a graphic processing unit according to an embodiment of the present inventive concept.

Referring to FIG. 2, the graphic processing unit 100 may include a geometry processing unit 110 and a rendering processing unit 120. In an embodiment of the present inventive concept, the geometry processing unit 110 and the rendering processing unit 120 may operate using different processors from each other. However, the present inventive concept is not limited thereto. The geometry processing unit 110 and the rendering processing unit 120 may operate using a common processor.

The geometry processing unit 110 may include a vertex processing unit 112, a primitive assembly unit 114, and a tiling unit 116.

The vertex processing unit 112 may receive a vertex, convert the received vertex, and output the converted vertex. Here, the vertex may be provided from, for example, a central processing unit (CPU), but the present inventive concept is not limited thereto. The vertex may include properties, such as a position, a normal vector, a color value, texture coordinates, or the like, but the present inventive concept is not limited thereto.

The position property of the vertex may be provided as a coordinate in a three-dimensional (3D) space. For example, the position property of the vertex may include x coordinates, y coordinates, and z coordinates. Here, the x coordinates may be horizontal coordinates, the y coordinates may be vertical coordinates, and the z coordinates may be depth coordinates. The vertex processing unit 112 may convert an object space vertex into a clip space vertex.

For example, the vertex processing unit 112 may convert the object space vertex into a world space vertex, may convert the world space vertex into a camera space vertex, and may convert the camera space vertex into the clip space vertex.

The primitive assembly unit 114 may receive a clip space vertex, and may generate and output a primitive. The primitive assembly unit 114 may generate a primitive that includes at least one vertex. For example, the primitive assembly unit 114 may generate a triangle type primitive that includes three vertexes. Hereinafter, embodiments of the present inventive concept will be described using the triangle type primitive. However, the present inventive concept is not limited thereto and the present inventive concept may be applied to other types of primitives, for example, a point type primitive, a line type primitive, or a quadrangle type primitive, in substantially the same manner as those described above.

The primitive may include a property of connection information between vertexes. The connection information between the vertexes may indicate an order in which the vertexes included in the primitive are connected to each other (e.g., in a clockwise direction or a counterclockwise direction). In accordance with values of the connection information, a front face and a back face of the primitive may be discriminated from each other.

In an embodiment of the present inventive concept, when the primitive assembly unit 114 generates the primitive, a texture patch that corresponds to the generated primitive may be defined. Further, when the texture patch that corresponds to the generated primitive is defined, texture patch information may be generated together.

Hereinafter, referring to FIGS. 3 and 4, an operation of the primitive assembly unit 114 will be described in detail.

Figure 3:
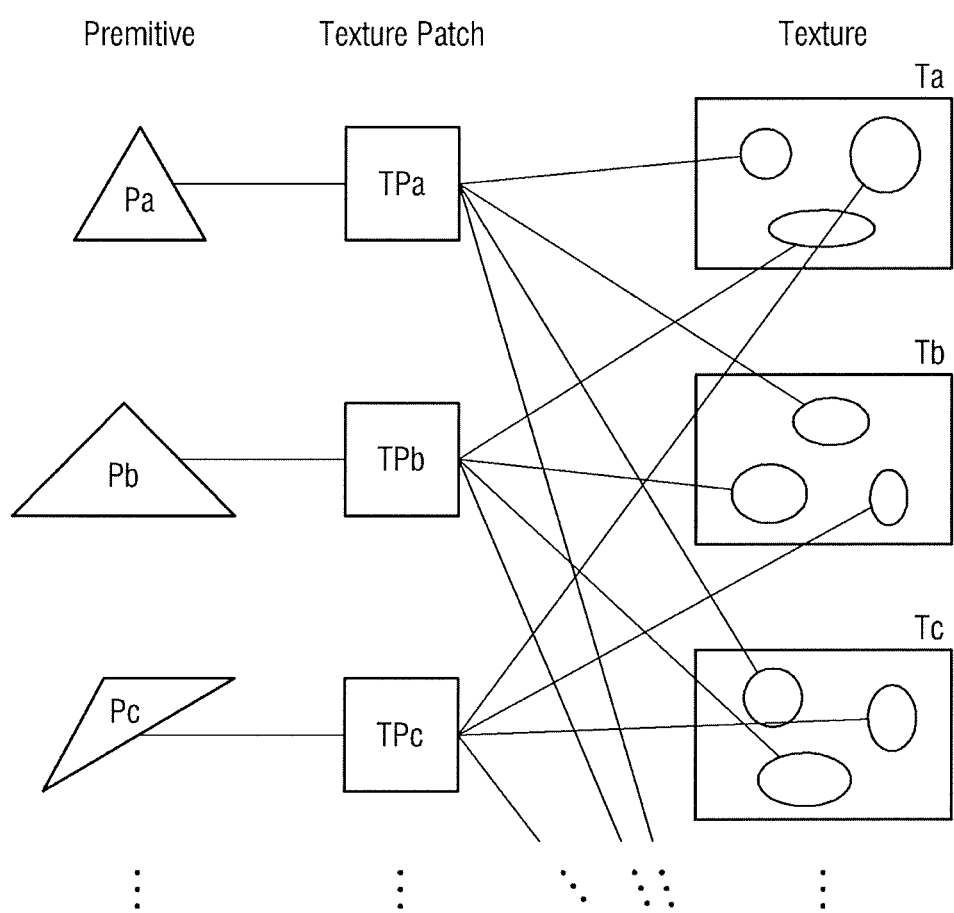
FIGS. 3 and 4 are diagrams illustrating an operation of a primitive assembly unit of FIG. 2 according to an embodiment of the present inventive concept.
Figure 4:
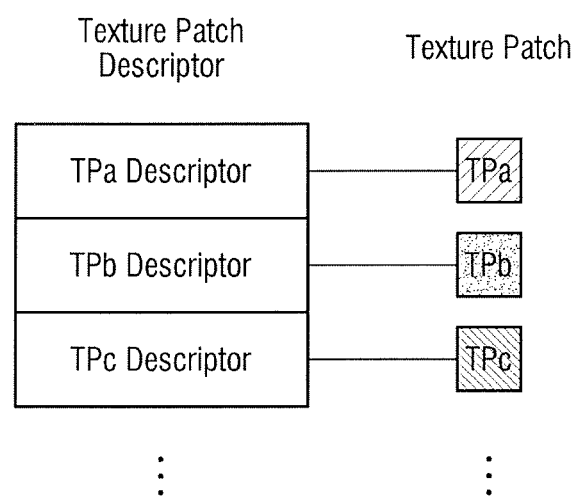

FIGS. 3 and 4 are diagrams illustrating an operation of a primitive assembly unit of FIG. 2 according to an embodiment of the present inventive concept.

Referring to FIG. 3, when first to third primitives Pa to Pc are generated from vertexes that the primitive assembly unit 114 receives, first to third texture patches TPa to TPc that correspond to the first to third primitives Pa to Pc, respectively, may be defined. Here, the first texture patch TPa may be, for example, a texture footprint that corresponds to the first primitive Pa in a first texture Ta stored in the external memory 200. Further, the second texture patch TPb may be, for example, a texture footprint that corresponds to the second primitive Pb in the first texture Ta stored in the external memory 200. Further, the third texture patch TPc may be, for example, a texture footprint that corresponds to the third primitive Pc in the first texture Ta stored in the external memory 200. For example, the first to third texture patches TPa to TPc that respectively correspond to the first to third primitives Pa to Pc may be defined from the first texture Ta.

In addition, in an embodiment of the present inventive concept, a plurality of textures (e.g., first to third textures Ta to Tc) may be stored in the external memory 200. In this case, as described above, the texture patches TPa to TPc may correspond to the plurality of textures Ta to Tc, respectively. For example, the first texture patch TPa may be a texture footprint that corresponds to the first primitive Pa in each of the first to third textures Ta to Tc, the second texture patch TPb may be a texture footprint that corresponds to the second primitive Pb in each of the first to third textures Ta to Tc, and the third texture patch TPc may be a texture footprint that corresponds to the third primitive Pc in each of the first to third textures Ta to Tc. For example, the number of textures Ta to Tc that correspond to each texture patch TPa to TPc may be increased without limit.

Referring to FIG. 4, when the texture patches TPa to TPc that correspond to the respective primitives Pa to Pc are defined as described above, the primitive assembly unit 114 may generate texture patch information together. In an embodiment of the present inventive concept, such texture patch information may include texture patch descriptors. Each of the texture patch descriptors may indicate regions where each of the texture patches TPa to TPc is defined in the textures Ta to Tc.

For example, a first texture patch descriptor (e.g., TPa descriptor) among the texture patch descriptors may indicate a region where the first texture patch TPa is defined in the respective textures Ta to Tc, a second texture patch descriptor (e.g., TPb descriptor) among the texture patch descriptors may indicate a region where the second texture patch TPb is defined in the respective textures Ta to Tc, and a third texture patch descriptor (e.g., TPc descriptor) among the texture patch descriptors may indicate a region where the third texture patch TPc is defined in the respective textures Ta to Tc.

Each of the texture patch descriptors (e.g., TPa to TPc descriptors) may include, for example, a start address value, the number of bytes, and an option value, for indicating corresponding texture patches TPa to TPc in the respective textures Ta to Tc, but the present inventive concept is not limited thereto. In an embodiment of the present inventive concept, the texture patch descriptors (e.g., TPa to TPc descriptors) generated as above may be stored, for example, in the external memory 200.

As described above, when the texture patches TPa to TPc that correspond to the respective primitives Pa to Pc are defined, the primitive assembly unit 114 may generate the texture patch information (e.g., TPa to TPc descriptors) and stores the generated texture patch information in the external memory 200, but the present inventive concept is not limited thereto. In an exemplary embodiment of the present inventive concept, a time point when the texture patch information is generated may be advanced or may be delayed with respect to a time point when the texture patches TPa to TPc are defined.

Referring again to FIG. 2, the tiling unit 116 may receive the primitive output from, for example, the primitive assembly unit 114, and generate and output a primitive list. Hereinafter, referring to FIGS. 5 to 7, the tiling unit 116 according to an embodiment of the present inventive concept will be described in more detail.

Figure 5:
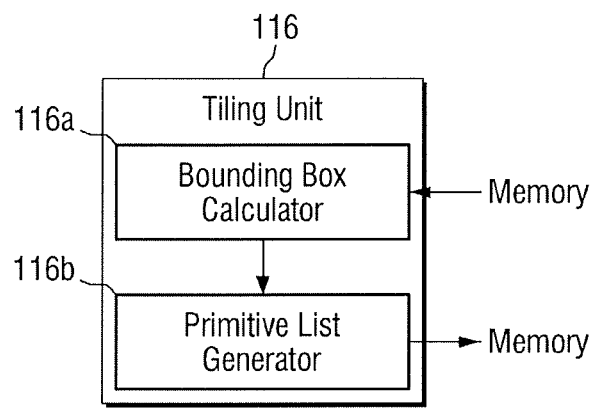
FIG. 5 is a block diagram illustrating a detailed configuration of a tiling unit of FIG. 2 according to an embodiment of the present inventive concept.
Figure 6:
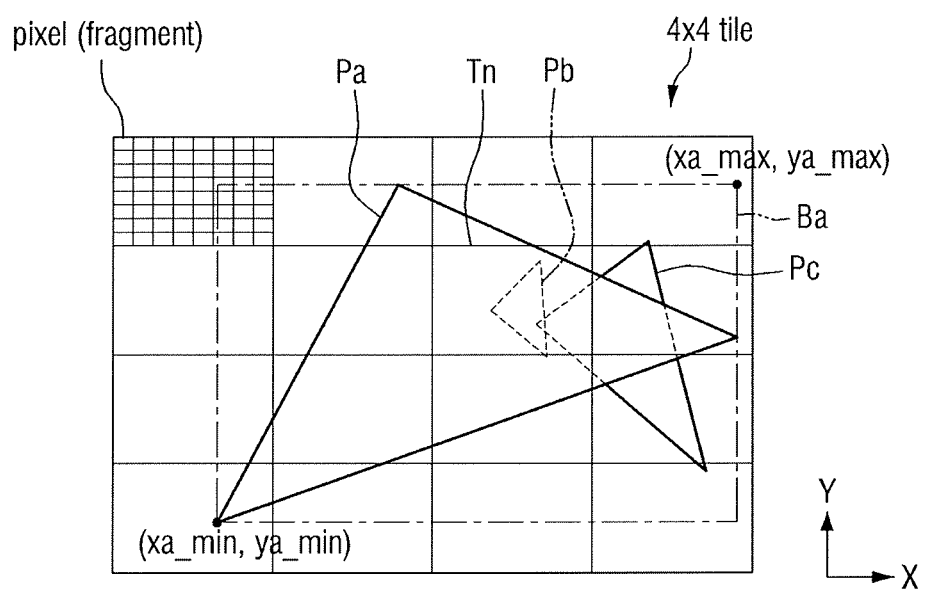
FIG. 6 is a block diagram illustrating an operation of the tiling unit of FIG. 5 according to an embodiment of the present inventive concept.

FIG. 5 is a block diagram illustrating a detailed configuration of a tiling unit of FIG. 2 according to an embodiment of the present inventive concept, FIG. 6 is a block diagram illustrating an operation of the tiling unit of FIG. 5 according to an embodiment of the present inventive concept, and FIG. 7 is a diagram illustrating an exemplary primitive list generated by a primitive list generator of FIG. 5 according to an embodiment of the present inventive concept.

Referring to FIG. 5, the tiling unit 116 may include a bounding box calculator 116a and a primitive list generator 116b.

The tiling unit 116 may divide an image frame to be rendered into a plurality of tiles. Each tile may include a plurality of pixels or fragments that are included in the image frame. Further, the tiling unit 116 may divide each tile into a plurality of sub-tiles.

By performing tile binning on the received primitive, the tiling unit 116 may approximately determine which tiles the received primitive touches. What a primitive touches a particular tile may be understood to mean that at least a portion of the primitive belongs to the corresponding tile. Further, the tiling unit 116 may allocate the primitive that touches the tile, for example, to a primitive list for the corresponding tile as illustrated in FIG. 7. The graphics pipeline may perform rendering on the respective tiles to complete the rendering on the entire image frame.

To this end, the bounding box calculator 116a may calculate a bounding box that forms boundaries of the primitive. For example, in the case of a triangle type primitive, the bounding box calculator 116a may calculate the bounding box using a maximum value and a minimum value of the x coordinates and a maximum value and a minimum value of the y coordinates which correspond to three vertexes that constitute the primitive. In an embodiment of the present inventive concept, a 3D bounding box may be calculated. In this case, the bounding box calculator 116a may calculate the 3D bounding box using the x coordinates, y coordinates, and z coordinates of the primitive.

For example, in the case of the triangle type primitive, the bounding box calculator 116a may calculate the 3D bounding box using a maximum value and a minimum value of each of the x coordinates, y coordinates, and z coordinates of the three vertexes that constitute the primitive.

The bounding box may be calculated in a shape that completely surrounds the boundaries of the primitive. For example, in the first primitive Pa illustrated in FIG. 6, the bounding box Ba may be defined by the maximum value xa_min and the minimum value xa_min of the x coordinates and the maximum value ya_max and the minimum value ya_min of the y coordinates of the three vertexes that constitute the primitive. The maximum values xa_max, ya_max and the minimum values xa_min, ya_min in the x coordinates and the y coordinates that define the first bounding box Ba may be used to perform tile binning on the first primitive Pa.

For example, in 4×4 tiles of FIG. 6, the tiling unit 116 may perform tile binning on the first primitive Pa using the x coordinates and the y coordinates of the first bounding box Ba. FIG. 6 illustrates primitives Pa, Pb, and Pc and a bounding box Ba projected onto a two-dimensional (2D) screen. In an embodiment of the present inventive concept, for convenience of description, the 2D screen is divided into 4×4 tiles, but the present inventive concept is not limited thereto.

Using the maximum value (e.g., xa_max, ya_max) and the minimum value (e.g., xa_min, ya_min) of the x coordinates and the y coordinates of the first bounding box Ba, the tiling unit 116 may determine that the first primitive Pa touches a plurality of tiles (for example, an n-th tile Tn) and may allocate the first primitive Pa to a primitive list of the n-th tile Tn. Then, in the same manner, the tiling unit 116 may determine that the second primitive Pb and the third primitive Pc touch the n-th tile Tn, and may allocate the second primitive Pb and the third primitive Pc to the primitive list of the n-th tile Tn.

The primitive list generator 116b may generate and output a primitive list for each tile to the external memory 200. The primitive list that is output and stored in the external memory as described above may be used by a rasterizer 122 and a texture unit 126 which will be described later. In this case, the primitive list that is output to the external memory 200 may include, as illustrated in FIG. 7, position information, attribute information, or texture patch descriptor information for each primitive that belongs to a corresponding one of the divided tiles.

In an embodiment of the present inventive concept, the texture patch descriptor information that is included in the primitive list may include indexes indicating the texture patch descriptors. When the primitive list that is output by the primitive list generator 116b includes only the indexes indicating the texture patch descriptors, the texture patches that belong to the respective tiles can be identified, and an entire size of the primitive list can be minimized. For example, in storing the primitive list, for example, in the external memory 200, an overhead of the external memory 200 can be reduced.

When the tiling unit 116 manages image frames by a unit of a sub-tile, the tiling unit 116 may generate and output a primitive list for each sub-tile to the external memory 200. In this case, the primitive list that is output to the external memory 200 may include position information, attribute information, or texture patch descriptor information for primitives belonging to the each sub-tile.

Referring again to FIG. 2, the rendering processing unit 120 may include a rasterizer 122, a fragment processing unit 124, and a texture unit 126.

The rasterizer 122 may perform rasterization on the respective primitives to convert the primitives into fragments. Hereinafter, referring to FIG. 8, an operation of the rasterizer 122 will be described in more detail.

Figure 8:
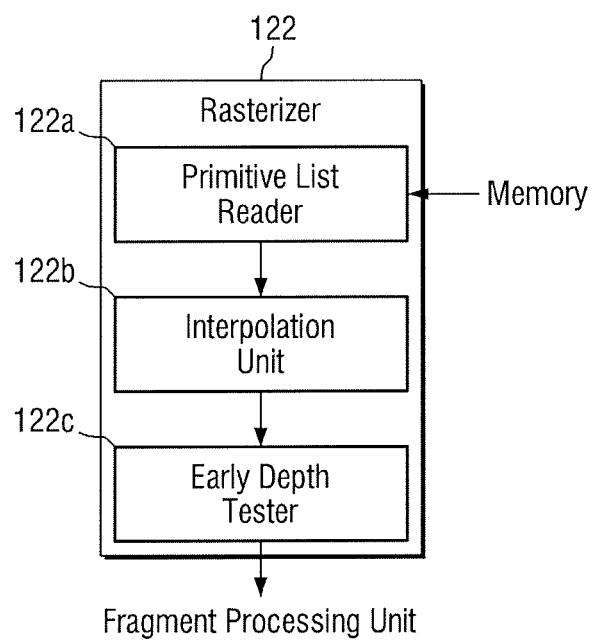
FIG. 8 is a block diagram illustrating a detailed configuration of a rasterizer of FIG. 2 according to an embodiment of the present inventive concept.

FIG. 8 is a block diagram illustrating a detailed configuration of the rasterizer of FIG. 2 according to an embodiment of the present inventive concept.

Referring to FIG. 8, the rasterizer 122 may include a primitive list reader 122a, an interpolation unit 122b, and an early depth tester 122c.

The primitive list reader 122a may read the primitive list for each tile from the external memory 200. For example, the primitive list reader 122a may receive the primitives, which belong to the each tile, according to a rendering order.

The interpolation unit 122b may generate a set of fragments using the primitives that are provided through the primitive list reader 122a. The fragments may be understood to mean 3D dots that constitute the interior of each primitive. The respective fragments may correspond to respective pixels of an image frame. For example, the x coordinates and the y coordinates of the fragments may be aligned on pixel-grid of a 2D screen.

The interpolation unit 122b may determine positions of fragments, normal vectors of the fragments, and color values of the fragments by interpolating values of vertexes that constitute each primitive. For example, position properties of the fragments may include x coordinates, y coordinates, and z coordinates in substantially the same manner as position properties of the vertexes. The z coordinates may indicate depth values of the fragments.

The early depth tester 122c may perform early depth test of a fragment level for each tile. The early depth test may determine visibility for fragments that belong to the corresponding tile, may determine visible fragments among the fragments to be displayed from the image frame of which the rendering has been completed, and may discard data of invisible fragments among the fragments.

The early depth tester 122c may determine a maximum depth value and a minimum depth value of the fragments that belong to the interior of the corresponding tile according to a result of the test. The early depth tester 122c may determine visibility for the fragments by comparing a depth value of the corresponding tile with a depth value of each fragment. Unlike a maximum depth value and a minimum depth value of the tile in the tiling stage, as a maximum depth value and a minimum depth value of the tiles in the rasterization stage, a maximum depth value and a minimum depth value of the depth values of the fragments that belong to the corresponding tile may be allocated. If a depth value of a fragment is larger than the maximum depth value of the tile, the early depth tester 122c may determine the corresponding fragment as an invisible fragment. If the depth value of the corresponding fragment is smaller than the maximum depth value of the tile, the early depth tester 122c may determine the corresponding fragment as a visible fragment. When a first fragment having the maximum depth value of the tile is replaced by a second fragment which has the same x and y coordinates and has a depth value (e.g., z coordinate) smaller than the maximum depth value of the tile, the early depth tester 122c may update the maximum depth value of the tile with the depth value of the second fragment.

For example, as illustrated in FIG. 6, the early depth tester 122c may determine visibility of the fragments that constitute the first primitive Pa for the n-th tile Tn, and may allocate a maximum depth value and a minimum depth value among the depth values of the fragments, which belong to the n-th tile Tn and constitute the first primitive Pa, as the maximum depth value and the minimum depth value of the n-th tile Tn. The early depth tester 122c may determine visibility of fragments that constitute the third primitive Pc for the n-th tile Tn. Since depth values of the fragments that constitute the second primitive Pb are larger than the maximum depth value of the n-th tile Tn, the early depth tester 122c may determine the fragments that constitute the second primitive Pb as invisible fragments for the n-th tile Tn. If the visibility of the fragments that constitute the third primitive Pc is determined, as described above, for the n-th tile Tn, the early depth tester 122c may also determine the fragments that constitute the third primitive Pc as invisible fragments with respect to the n-th tile Tn. Accordingly, fragments that are output from the rasterizer 122 may be related to the first primitive Pa only.

Referring again to FIG. 2, the fragment processing unit 124 may perform fragment shading including hidden surface elimination, lighting, surface shading, and texturing on the input fragments. In this case, according to an exemplary embodiment of the present inventive concept, the texture unit 126 may be used for the fragment shading by the fragment processing unit 124.

The fragment shading is to apply color values and textures to the respective fragments. In the case of performing the fragment shading on color formats (e.g., YC, YCbCr, and YPbPr) having color values having different degrees of importance from each other, the fragment processing unit 124 may perform the fragment shading on the first color value CV_1 and may not perform the fragment shading on the second color value CV_2. Here, the first color value CV_1 may include a luma component, and the second color value CV_2 may include a chroma component.

Further, the fragment processing unit 124 may perform anti-aliasing. The anti-aliasing may be understood to mean to reduce a color difference at a boundary line of a digital image by mixing colors around the boundary line of the digital image, and thus, a stair-step phenomenon may be removed. In the case of performing the anti-aliasing on the color formats (e.g., YC, YCbCr, and YPbPr) having the color values having different degrees of importance from each other, the fragment processing unit 124 may perform the anti-aliasing on the different color values (e.g., the first and second color values CV_1 and CV_2) from each other using different numbers of sampling data from each other.

For example, in the case of performing the anti-aliasing using the MSAA method, the fragment processing unit 124 may perform the anti-aliasing by applying 8×MSAA to the first color value CV_1, and may perform the anti-aliasing by applying 4×MSAA, 2×MSAA, or a single sample to the second color value CV_2. Further, the fragment processing unit 124 may perform the anti-aliasing on the first color value CV_1 and may not perform the anti-aliasing on the second color value CV_2. Here, the first color value CV_1 may include the luma component, and the second color value CV_2 may include the chroma component.

When the fragment shading and the anti-aliasing of all the fragments are performed through the above-described processes, the fragment processing unit 124 may output an image frame of which the rendering has been completed to a frame buffer or a display.

Next, referring to FIG. 9, a graphic processing unit according to an embodiment of the present inventive concept will be described. Hereinafter, descriptions of the same constituent elements as those described with reference to the above-described drawings will be omitted, and the descriptions will be made on different points between FIG. 9 and the above-described drawings.

Figure 9:
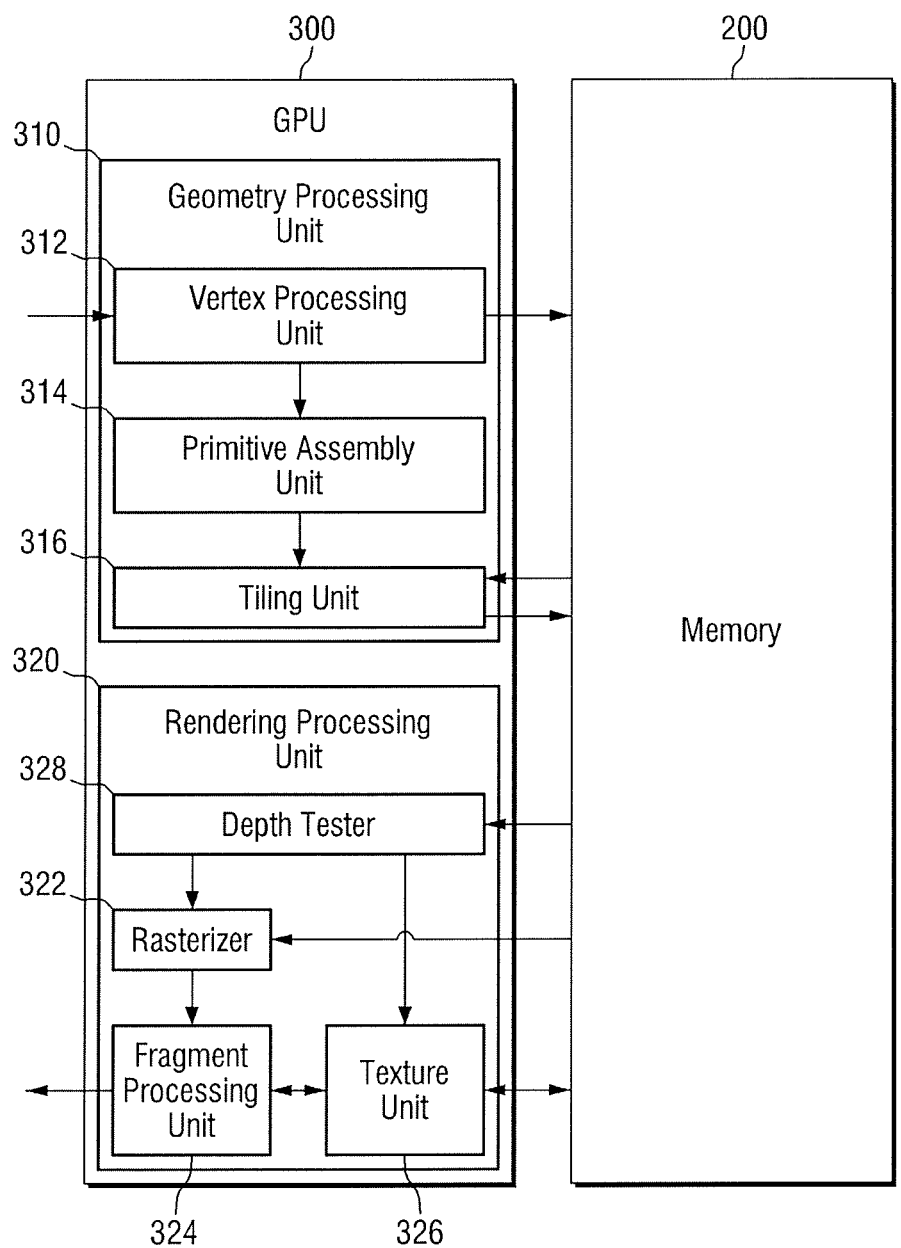
FIG. 9 is a block diagram illustrating a detailed configuration of a graphic processing unit according to an embodiment of the present inventive concept.

FIG. 9 is a block diagram illustrating a detailed configuration of a graphic processing unit according to an embodiment of the present inventive concept.

Referring to FIG. 9, the graphic processing unit 300 may include a geometric processing unit 310 and a rendering processing unit 320. The geometric processing unit 310 includes a vertex processing unit 312, a primitive assembly unit 314, and a tiling unit 316. The rendering processing unit 320 may include a depth tester 328, a rasterizer 322, a fragment processing unit 324, and a texture unit 326. The depth tester 328 may perform visibility test on primitives to discard invisible primitives. The rasterizer 322 may perform rasterization on an output of the depth tester 328.

Hereinafter, referring to FIGS. 10 and 11, an operation of the depth tester 328 will be described in more detail.

Figure 10:
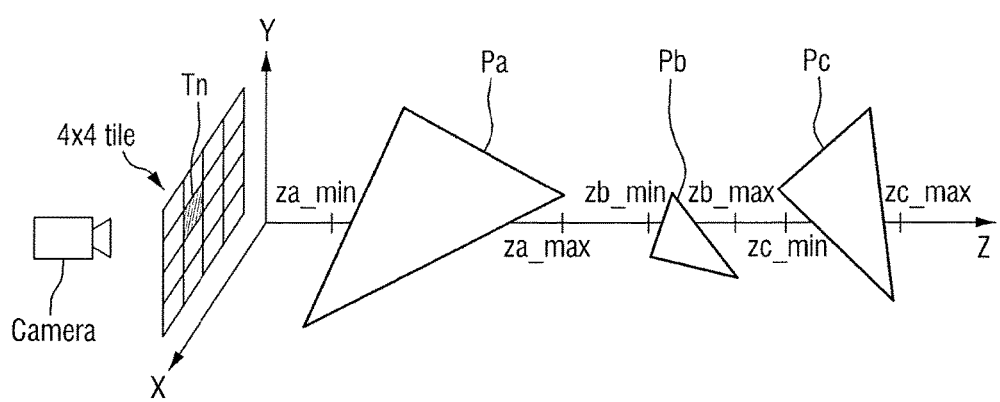
FIGS. 10 and 11 are diagrams illustrating an operation of a depth tester of FIG. 9 according to an embodiment of the present inventive concept.
Figure 11:
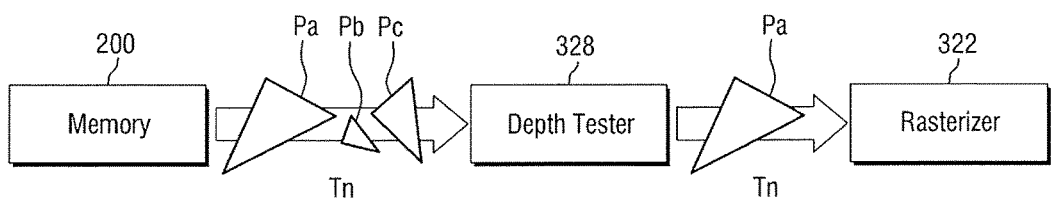

FIGS. 10 and 11 are diagrams illustrating an operation of the depth tester of FIG. 9 according to an embodiment of the present inventive concept.

As exemplary described above with reference to FIG. 6, the first to third primitives Pa, Pb, and Pc each belong to the n-th tile Tn. Accordingly, the depth tester 328 may receive the first to third primitives Pa, Pb, and Pc with respect to the n-th tile Tn, and may perform depth test to discard the invisible primitives by performing the visibility test on the first to third primitives Pa, Pb, and Pc.

For example, referring to FIG. 10, in performing the depth test on the n-th tile Tn, the primitives may be input in a rendering order of the third primitive Pc, the second primitive Pb, and the first primitive Pa. In this case, the depth tester 328 may first allocate an identification (ID) of the closest primitive as an ID of the third primitive Pc. In this case, for example, a minimum depth value of the n-th tile may be a minimum depth value zc_min of the third primitive Pc. Since a minimum depth value zb_min of the second primitive Pb is smaller than the minimum depth value (e.g., the minimum depth value zc_min of the third primitive Pc) of the n-th tile Tn, the depth tester 328 may update the second primitive Pb with a new closest primitive. In this case, for example, maximum and minimum depth values of the n-th tile may be the maximum and minimum depth values zb_min and zb_max, respectively, of the second primitive Pc. Further, since the minimum depth value zc_min of the third primitive Pc is larger than the maximum depth value (e.g., the maximum depth value zb_max of the second primitive Pb) of the n-th tile Tn, the depth tester 328 may determine that the third primitive Pc is hidden by the second primitive Pb in the n-th tile Tn. Since a minimum depth value za_min of the first primitive Pa is smaller than the minimum depth value (e.g., the minimum depth value zb_min of the second primitive Pb) of the n-th tile Tn, the depth tester 328 may update the first primitive Pa with a new closest primitive. In this case, for example, maximum and minimum depth values of the n-th tile may be the maximum and minimum depth values za_min and za_max, respectively, of the first primitive Pa. Since the minimum depth value zb_min of the second primitive Pb is larger than the maximum depth value (e.g., the maximum depth value za_max of the first primitive Pa) of the n-th tile Tn, the depth tester 328 may determine that the second primitive Pb is hidden by the first primitive Pa in the n-th tile Tn.

Accordingly, as illustrated in FIG. 11, since the second and third primitives Pb and Pc are hidden by the first primitive Pa, the second and third primitives Pb and Pc are determined to be invisible and are discarded, and thus, only the first primitive Pa is provided to the rasterizer 322.

As described above, the rasterizer 322 which receives the first primitive Pa can perform the rasterization on the first primitive Pa. In an embodiment described with reference to FIGS. 1 to 8, the rasterizer 122 performs the rasterization on all the first to third primitives Pa, Pb, and Pc. In an embodiment described with reference to FIGS. 9 to 11, the rasterizer 322 performs rasterization on the first primitive Pa output from the depth test 328. In addition, since the vertex processing unit 312, the primitive assembly unit 314, the tiling unit 316, the fragment processing unit 324 and the texture unit 326 are substantially the same as those shown in FIG. 2, duplicate descriptions thereof will be omitted, and the descriptions will be made on different points between FIGS. 9 to 11 and the above-described drawings.

In addition, referring to FIG. 12, a graphic processing unit according to an embodiment of the present inventive concept will be described. Hereinafter, descriptions of the same constituent elements as those described with reference to the above-described drawings will be omitted, and the descriptions will be made on different points between FIG. 12 and the above-described drawings.

Figure 12:
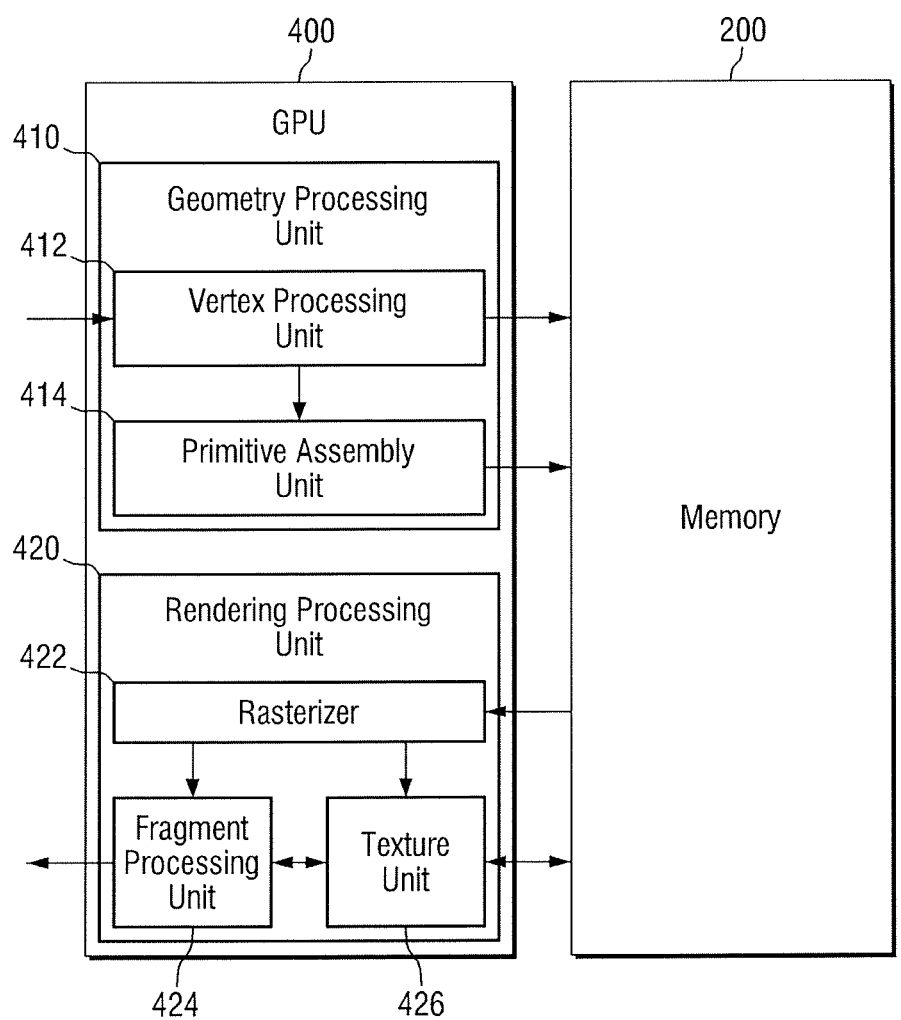
FIG. 12 is a block diagram illustrating a detailed configuration of a graphic processing unit according to an embodiment of the present inventive concept.

FIG. 12 is a block diagram illustrating a detailed configuration of a graphic processing unit according to an embodiment of the present inventive concept.

Referring to FIG. 12, the graphic processing unit 400 may include a geometric processing unit 410 and a rendering processing unit 420. The geometric processing unit 410 includes a vertex processing unit 412 and a primitive assembly unit 414. The rendering processing unit 420 may include a rasterizer 422, a fragment processing unit 424, and a texture unit 426. The geometric processing unit 410 may not include the tiling unit 116 (see FIG. 2) or 316 (see FIG. 11) as described above. For example, the graphic processing unit 400 of FIG. 12 according to an embodiment of the present inventive concept may perform a primitive-based rendering and may not perform the tile-based rendering which is performed by the graphic processing unit 100 of FIG. 2 or the graphic processing unit 300 of FIG. 9 according to an embodiment of the present inventive concept. Accordingly, referring to FIG. 12, the rasterizer 422 performs rasterization for each of primitives that are generated by the primitive assembly unit 414.

In addition, since the vertex processing unit 412, the fragment processing unit 424, and the texture unit 426 are substantially the same as those shown in FIG. 2 or FIG. 9, duplicate descriptions thereof will be omitted.

Hereinafter, an anti-aliasing method according to an embodiment of the present inventive concept will be described. Duplicate descriptions of substantially the same contents as those described as above will be omitted.

Figure 13:
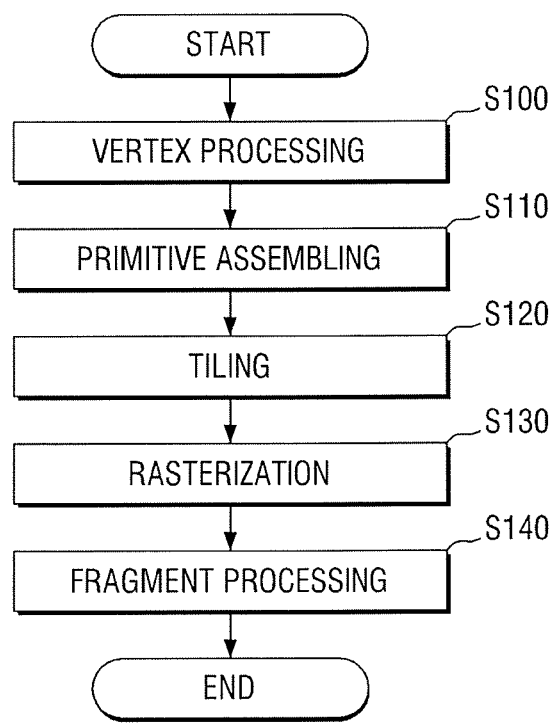
FIG. 13 is a flowchart illustrating an anti-aliasing method according to an embodiment of the present inventive concept.

FIG. 13 is a flowchart illustrating an anti-aliasing method according to an embodiment of the present inventive concept.

Referring to FIG. 13, a vertex is input from, for example, a central processing unit (CPU), and the input vertex is converted and output (S100).

A plurality of primitives, each of which includes at least one vertex, is generated (S110). In this case, a texture patch that corresponds to the generated primitive may be defined. Further, when the texture patch that corresponds to the generated primitive is defined, texture patch information may be generated together.

Tiling on the plurality of primitives is performed in a rendering order (S120). For example, an image frame is divided into a plurality of tiles, tile binning on the plurality of primitives is performed in a rendering order, and a primitive list for each tile is generated on the basis of a result of the tile binning.

The primitives that touch the corresponding tiles are rasterized by a unit of tile (S130). Fragment processing is performed on fragments (S140). For example, the fragment processing may be fragment shading including hidden surface elimination, lighting, surface shading, texturing, or the like. Further, anti-aliasing may be exemplified as the fragment shading. The anti-aliasing may be performed on the fragments of which the fragment shading has been performed. In this case, the anti-aliasing may be performed on different color data from each other having different color values from each other corresponding to at least one of color formats (e.g., YC, YCbCr, and YPbPr). The color values may have different degrees of importance from each other.

For example, in the case of performing the anti-aliasing using the MSAA method, the anti-aliasing may be performed by applying 8×MSAA to a first color value CV_1, and the anti-aliasing may be performed through applying 4×MSAA, 2×MSAA, or a single sample to a second color value CV_2 having different color format from the first color value CV_1. Further, the anti-aliasing may be performed on the first color value CV_1 and the anti-aliasing may not be performed on the second color value CV_2. Here, the first color value CV_1 may include the luma component, and the second color value CV_2 may include the chroma component.

Figure 14:
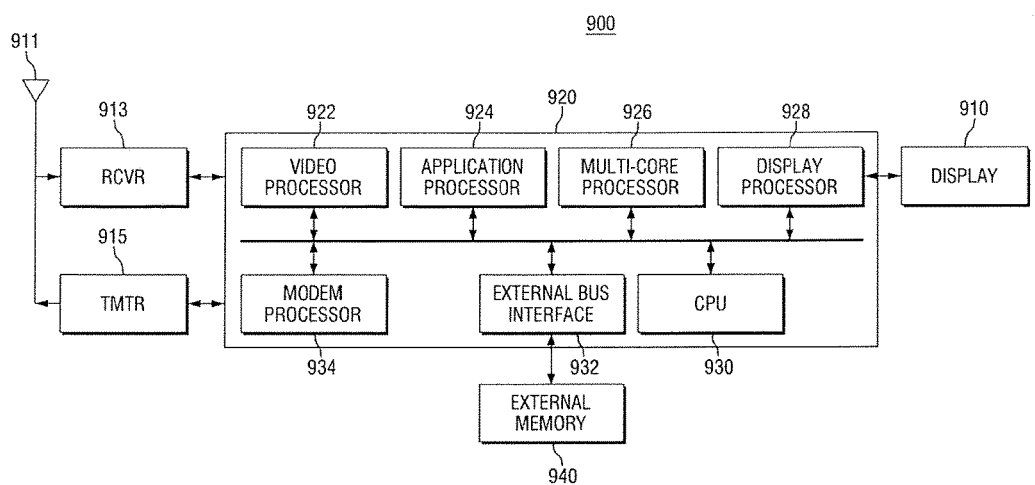
FIG. 14 is a block diagram illustrating a wireless communication device including a graphic processing unit according to an embodiment of the present inventive concept.

FIG. 14 is a block diagram illustrating a wireless communication device that includes a graphic processing unit using a method for controlling rendering quality according to an embodiment of the present inventive concept.

Referring to FIG. 14, a device 900 may be a cellular phone, a smart phone terminal, a handset, a personal digital assistant (PDA), a laptop computer, a video game unit, or the like. The device 900 may use a code division multiple access (CDMA) scheme, a time division multiple access (TDMA) scheme, or the like, which is used in a wireless communication standard such as a global system for mobile communications (GSM), or like.

The device 900 may provide a bi-directional communication through a reception path and a transmission path. On the reception path, a signal transmitted from one or more base stations may be received through an antenna 911 of the device 900 or may be provided to a receiver (RCVR) 913 of the device 900. The receiver 913 may perform conditioning and digitalization on the received signal and provide digitized samples to a digital section 920 for an additional processing. On the transmission path, a transmitter (TMTR) 915 may receive data transmitted from the digital section 920, perform processing and conditioning of the data, and generate a modulated signal. The modulated signal may be transmitted to one or more base stations through the antenna 911.

The digital section 920 may include one or more digital signal processors (DSP), a microprocessor, and a reduced instruction set computer (RISC). Further, the digital section 920 may be formed on one or more application-specific integrated circuits (ASIC) or other types of integrated circuits (IC).

The digital section 920 may further include, for example, various processing and interface units, such as a modem processor 934, a video processor 922, an application processor 924, a display processor 928, a controller/multi-core processor 926, a central processing unit 930, an external bus interface (EBI) 932, or the like.

The video processor 922 may perform processing on graphic applications, and may adopt the graphic processing unit 100 or 1100 according to an embodiment of the present inventive concept. The video processor 922 may include a plurality of processing units or modules corresponding to a plurality of graphic operations, respectively.

A specific part of the video processor 922 may be implemented by a firmware and/or software. For example, a control unit may be implemented by firmware and/or software modules (e.g., procedures or functions) for performing the above-described functions. Firmware and/or software codes may be stored in a memory (e.g., the external memory 200 in FIG. 1), or may be executed by a processor (e.g., the multi-core processor 926). The memory may be implemented in the processor (e.g., the video processor 922) or out of the processor.

The video processor 922 may implement a software interface, such as open graphic library (OpenGL), Direct3D, or the like. The central processing unit (CPU) 930 may perform a series of graphic processing operations together with the video processor 922. The controller/multi-core processor 926 may include at least two cores, and allocate work loads to two cores depending on the work loads to be processed by the controller/multi-core processor 926 and thus, the corresponding work loads may be processed at the same time.

Figure 15:
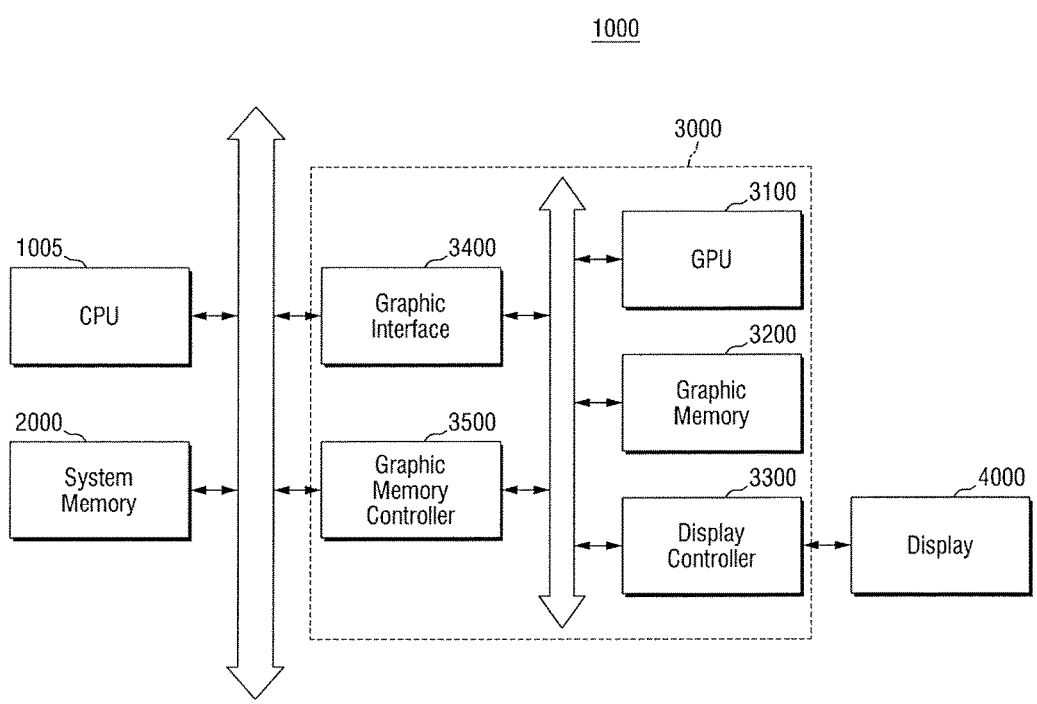
FIG. 15 is a block diagram illustrating a computing system including a graphic processing unit according to embodiments of the present inventive concept.

FIG. 15 is a block diagram illustrating a computing system that includes a graphic processing unit according to an embodiment of the present inventive concept.

Referring to FIG. 15, a computing system 1000 according to an embodiment of the present inventive concept includes a central processing unit (CPU) 1005, a system memory 2000, a sub-graphic system 3000, and a display 4000.

The central processing unit 1005 is configured to generate a mesh by driving an application. The mesh may describe a surface of an object. The mesh may include a plurality of primitives, and each of the primitives may include at least one vertex.

The system memory 2000 is configured to store data. The system memory 2000 may store data that is processed by the central processing unit 1005. The system memory 2000 may serve as an operating memory of the central processing unit 1005. The system memory 2000 may include one or more volatile memories such as a double data rate static dynamic random access memory (DDR SDRAM), a single data rate random access memory (SDRAM), or the like, and/or one or more nonvolatile memories such as an electrical erasable programmable read only memory (EEPROM), a flash memory, or the like.

The sub-graphic system 3000 may include a graphic processing unit (GPU) 3100, a graphic memory 3200, a display controller 3300, a graphic interface 3400, and a graphic memory controller 3500.

The graphic processing unit 3100 may be configured in substantially the same manner as the graphic processing unit 100 or 1100 according to an embodiment of the present inventive concept as described above. The graphic processing unit 3100 may perform tile-based rendering by using a plurality of primitives that constitute the mesh. The graphic processing unit 3100 may receive data of the vertexes that constitute the mesh from the central processing unit 1005. The graphic processing unit 3100 may assemble the primitives each including at least one vertex and may perform the rendering using the assembled primitives.

The graphic memory 3200 may store graphic data that is processed by the graphic processing unit 3100 or graphic data that is provided to the graphic processing unit 3100. Further, the graphic memory 3200 may serve as an operating memory of the graphic processing unit 3100.

The display controller 3300 may control the display 4000 to display rendered image frames.

The graphic interface 3400 may perform interfacing between the central processing unit 1005 and the graphic processing unit 3100, and the graphic memory controller 3500 may provide a memory access between the system memory 2000 and the graphic processing unit 3100.

The computing system 1000 may further include one or more input devices, such as buttons, a touch screen, a microphone, or the like, and/or one or more output devices, such as speakers, or the like. Further, the computing system 1000 may further include an interface device for exchanging data with an external device by a wire or wireless channel. The interface device may include, for example, an antenna or a wire/wireless transceiver.

According to an embodiment of the present inventive concept, the computing system 1000 may be a mobile phone, a smart phone, a personal digital assistant (PDA), a desktop computer, a notebook computer, a tablet, or the like.

The method according to an embodiment of the present inventive concept or an algorithm corresponding to the method may be implemented by a hardware module, a software module, or a combination of the hardware and software modules, which may be executed by a processor. The software module may reside in a computer-readable recording medium such as a random access memory (RAM), a flash memory, a read only memory (ROM), an EPROM memory, an EEPROM memory, a register, a hard disk, a detachable disk, a compact disk read only memory (CD-ROM), or the like. An exemplary recording medium may be connected to a processor, and the processor may read information from the recording medium or write information in the recording medium. In an exemplary embodiment of the present inventive concept, the recording medium may be integrated in the processor. The processor and the recording medium may reside in an application-specific integrated circuit (ASIC). The ASIC may reside in a user terminal. In an exemplary embodiment of the present inventive concept, the processor and the recording medium may reside as individual constituent elements in the user terminal.

Although the present inventive concept has been particularly shown and described with reference to exemplary embodiments thereof, it will be understood that various changes in form and details may be made therein without departing from the scope and spirit of the present inventive concept as disclosed in the accompanying claims.

What is claimed is:

1. A graphic processing unit comprising:
    a geometry processing unit configured to receive vertexes and to generate at least one primitive using the vertexes; and
    a rendering processing unit configured to convert the generated at least one primitive into fragments, to perform fragment shading on the converted fragments, and to perform anti-aliasing on the fragments on which the fragment shading has been performed,
    wherein the rendering processing unit performs the anti-aliasing on first color data and second color data that is different from the first color data using different operations from each other.

2. The graphic processing unit of claim 1, wherein the different operations of anti-aliasing performed by the rendering processing unit on the first color data and the second color data include using different numbers of sampling data, respectively.

3. The graphic processing unit of claim 2, wherein the rendering processing unit uses a supersampling anti-aliasing (SSAA) method, a multisampling anti-aliasing (MSAA) method, or a morphological anti-aliasing (MLAA) method.

4. The graphic processing unit of claim 1, wherein the rendering processing unit performs the fragment shading on the first color data and the second color data using different operations from each other.

5. The graphic processing unit of claim 1, wherein the geometry processing unit comprises:
    a vertex processing unit configured to receive the vertexes, to convert the received vertexes, to output the converted vertexes; and
    a primitive assembly unit configured to generate the at least one primitive and texture patch information corresponding to the at least one primitive using the converted vertexes.

6. The graphic processing unit of claim 5, wherein the at least one primitive is of a triangle type.

7. The graphic processing unit of claim 5, wherein the geometry processing unit further comprises a tiling unit configured to divide an image frame into a plurality of tiles and to generate a first primitive list of the at least one primitive corresponding to a first tile of the plurality of tiles.

8. The graphic processing unit of claim 7, wherein the first primitive list includes position information and attribute information of the at least one primitive corresponding to the first tile.

9. The graphic processing unit of claim 1, wherein the rendering processing unit comprises:
    a rasterizer configured to perform rasterization on the at least one primitive to convert the at least one primitive into the fragments; and
    a fragment processing unit configured to perform the anti-aliasing on the fragments.

10. The graphic processing unit of claim 9, wherein the rendering processing unit further comprises a depth tester configured to perform visibility test on the at least one primitive, to determine an invisible primitive among the at least one primitive, and to discard the invisible primitive,
    wherein the rasterizer performs rasterization on an output of the depth tester.

11. The graphic processing unit of claim 1, wherein the rendering processing unit is configured to determine whether to perform anti-aliasing on color formats of color data based on different degrees of importance from each other.

12. A graphic processing unit comprising:
    a primitive assembly unit configured to receive vertexes and to generate at least one primitive using the vertexes;
    a tiling unit configured to divide an image frame into a plurality of tiles and generate texture patch information corresponding to the at least one primitive, wherein the at least one primitive corresponds to a first tile of the plurality of tiles; and
    a rendering processing unit configured to perform fragment shading on fragments in the at least one primitive using the generated texture patch information,
    wherein the rendering processing unit performs the fragment shading on first color data and second color data that is different from the first color data using different operations from each other, and wherein the fragment shading is performed on color formats having color value with different degrees of importance from each other.

13. The graphic processing unit of claim 12, wherein different operations of fragment shading performed by the rendering processing unit on the first color data and the second color data include using different numbers of sampling data from each other.

14. A graphic processing system comprising:
    a graphic processing unit configured to perform anti-aliasing on first color data and second color data that is different from the first color data; and
    an external memory configured to store first data generated when the graphic processing unit performs the anti-aliasing,
    wherein the graphic processing unit performs the anti-aliasing on the first color data and the second color data using different operations from each other.

15. The graphic processing system of claim 14, wherein the different operations of anti-aliasing performed by the graphic processing on the first color data and the second color data include using different numbers of sampling data from each other.

16. The graphic processing system of claim 15, wherein the graphic processing unit performs the anti-aliasing using a supersampling anti-aliasing (SSAA) method, a multisampling anti-aliasing method (MSAA), or a morphological anti-aliasing (MLAA) method.

17. The graphic processing system of claim 14, wherein the graphic processing unit generates at least one primitive using vertexes, converts the at least one primitive into fragments, and performs fragment shading on the converted fragments.

18. The graphic processing system of claim 14, further comprising a display unit configured to display the first data stored in the external memory.

* * * * *